United States Patent
Freyburger

(12)
(10) Patent No.: US 6,405,368 B1
(45) Date of Patent: Jun. 11, 2002

(54) METHOD FOR SEPARATE COMPILATION OF TEMPLATES

(76) Inventor: Brian Freyburger, P.O. Box 29141, San Francisco, CA (US) 94129-0141

(*) Notice: Subject to any disclaimer, the term of this patent is extended or adjusted under 35 U.S.C. 154(b) by 0 days.

(21) Appl. No.: 09/292,875

(22) Filed: Apr. 16, 1999

(51) Int. Cl.[7] .................................................. G06F 9/45
(52) U.S. Cl. ....................... 717/140; 717/102
(58) Field of Search ............................ 717/5, 7, 10, 11; 707/101

(56) References Cited

U.S. PATENT DOCUMENTS

| | | | | |
|---|---|---|---|---|
| 5,715,460 A | * | 2/1998 | Acker et al. ................... | 717/5 |
| 5,864,700 A | * | 1/1999 | Barton et al. ................... | 717/5 |
| 5,911,076 A | * | 6/1999 | Acker et al. ................... | 717/7 |
| 5,956,725 A | * | 9/1999 | Burroughs et al. ........ | 707/101 |
| 5,978,585 A | * | 11/1999 | Crelier ........................ | 717/5 |
| 6,141,792 A | * | 10/2000 | Acker et al. ................... | 717/5 |
| 6,317,871 B1 | * | 11/2001 | Andrews et al. ............... | 717/5 |

OTHER PUBLICATIONS

IBM Techical Disclosure Bulletin, "Directives for Controlling Automatic Document Generator for System Object Model Interface Definition Language," vol. 38, Issue 9, Sep. 1995, pp. 115–116.*

Bjarne Stroustrup, "Separate Compilation Must Stay!," X3J16/96–0067, WG21/N0885, Mar. 12, 1996, pp. 1–2.*

IBM Technical Disclosure Bulletin, "Build Create C++ Template Instantiations,", vol. 39, Issue 3, Mar. 1, 1996, pp. 333–338.*

Jaakko Jarvi, "Compiler Time Recursive Objects in C++," IEEE Tools 27 Proceedings of Technology of Object–Oriented Langauges, 1998, pp. 66–77.*

* cited by examiner

*Primary Examiner*—Tuan Q. Dam
(74) *Attorney, Agent, or Firm*—Blakely, Sokoloff, Taylor & Zafman LLP

(57) ABSTRACT

A method and apparatus for separate compilation of templates by creating an executable program from source programs having templates that include a source file having a template definition and one or more source files having a template instantiation, and by providing a compiled object file having the template definition as input to compilation processes for creating object files having the template instantiation upon object files are provided to a linker process for creating the executable program. In this way, compilation of the source programs may occur with the template definition occurring in only one source program.

6 Claims, 14 Drawing Sheets

METHOD FOR SEPARATE COMPILATION OF TEMPLATES

BACKGROUND OF THE INVENTION

1. Field of the Invention

The present invention relates to the field of programming languages and more specifically to compilation of programs having templates.

2. Description of the Related Art

The ANSI/ISO working group X3J16/WG21 has standardized a new programming language, C++, based upon C. One of the many features included in the language is "templates". A template allows the definition of a set of classes, functions, or variables, paramaterized by a set of template parameters. A program which references a template name must specify the values of the template parameters for the reference (either explicitly or implicitly). When a compiler encounters such a reference, the definition of the referenced template instance is generated from the template definition through a process known as instantiation.

One feature of most programming languages is the notion of separate compilation. This is illustrated by FIG. 1A. As shown in FIG. 1A, a plurality of separate source files 101, 102 and 103 are utilized as inputs to a compilation process. The source files include both source code and definitions of templates. Thus, separate compilation allows different parts of a complete program to be defined in multiple source files. Each source file 101–103 can be separately compiled into an object file 121–123 using a compilation step 111–113. Each source file thus compiled is referred to as a translation unit. A linker process 134 combines multiple object files into a single executable program 144.

FIG. 1B illustrates an alternative prior art process for forming an executable program. The source/definition 101 remains unchanged. However, the source for 102 and 103 includes a template instantiation in place of the definition. The source 101 is compiled first and provides as outputs an object file (as in FIG. 1A) and a template database 154. The template database, together with the source files 152 and 153 are used as inputs to the compilation process 112 and 113, respectively. In this way, the definition does not have to be repeated in each of source files 152 and 153.

Thus, while the process of FIG. 1B offers the advantage over FIG. 1A of avoiding repeating the template definitions, it requires that a separate template database 154 be provided. In addition, in both the process of FIG. 1A and FIG. 1B, a change in the template definition requires recompiling all of the source files.

The draft ANSI standard provides for the separate compilation of templates in C++. The definition of an instantiated template is only required to exist in one translation unit of the program. However, due to difficulties of implementing this strategy, there were proposals to the standard committee to relax this restriction.

SUMMARY OF THE INVENTION

This invention provides a simple method of implementing the separate compilation of templates by creating an executable program from source programs having templates comprising the steps of: providing a first source file having a template definition; providing a second source file having a template instantiation; compiling the first source file and the second source file into first and second object files, the first object file comprising a template definition; and linking the first and second object files into an executable program.

DETAILED DESCRIPTION OF THE PREFERRED EMBODIMENT

What is described herein is a method and apparatus for separate compilation of templates in a programming language. In the following description, numerous specific details are set forth in order to provide a thorough understanding of the present invention. The present invention may, however, be practiced without these specific details. In other instances, well-known algorithms, circuits, structures and techniques have not been shown in detail in order not to unnecessarily obscure the present invention.

1. Compiler I/O Files

Figure 1A:
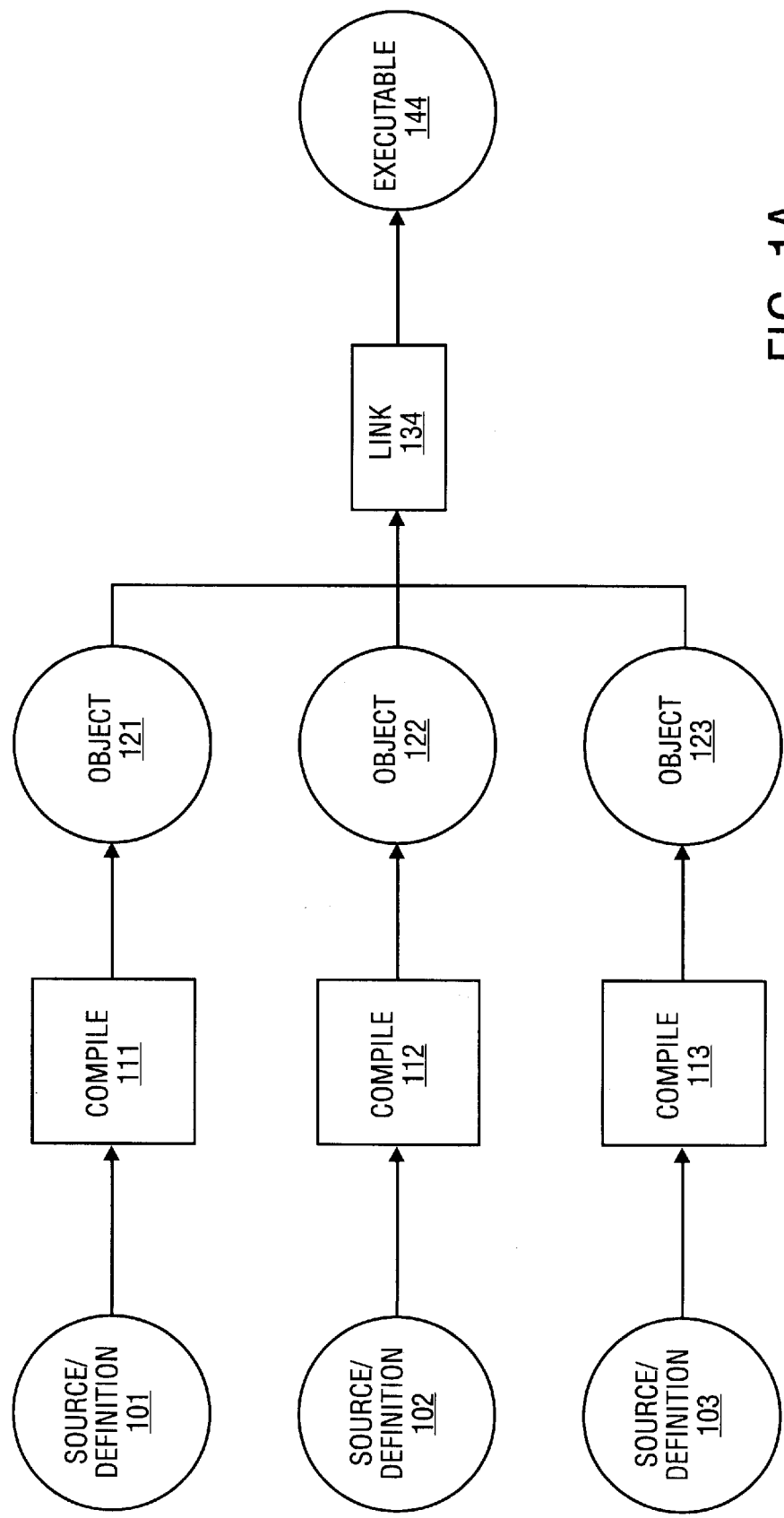
FIG. 1A illustrates a first prior art process of forming an executable file from object files.
Figure 1B:
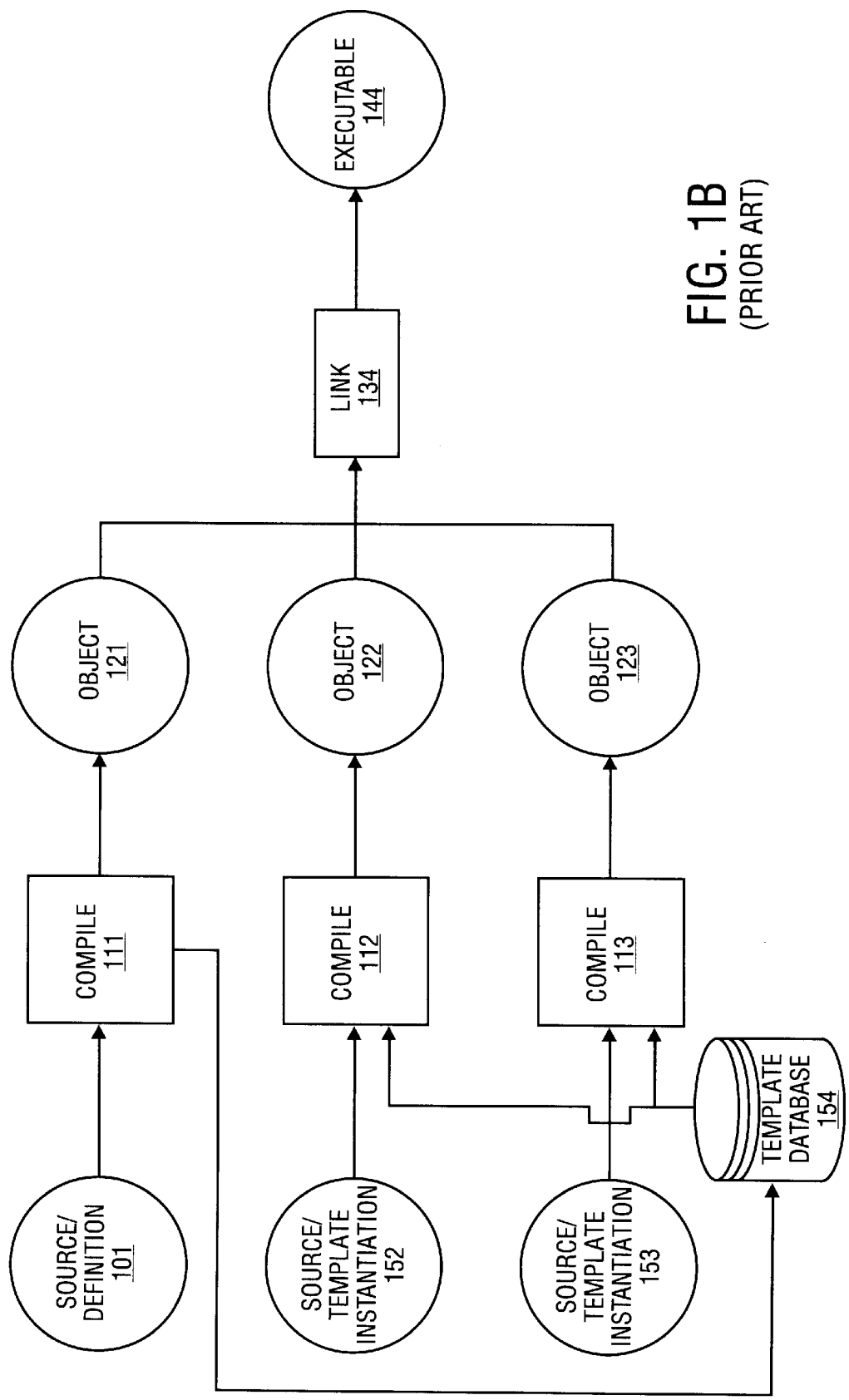
FIG. 1B illustrates a second prior art process of forming an executable file from object files.
Figure 1C:
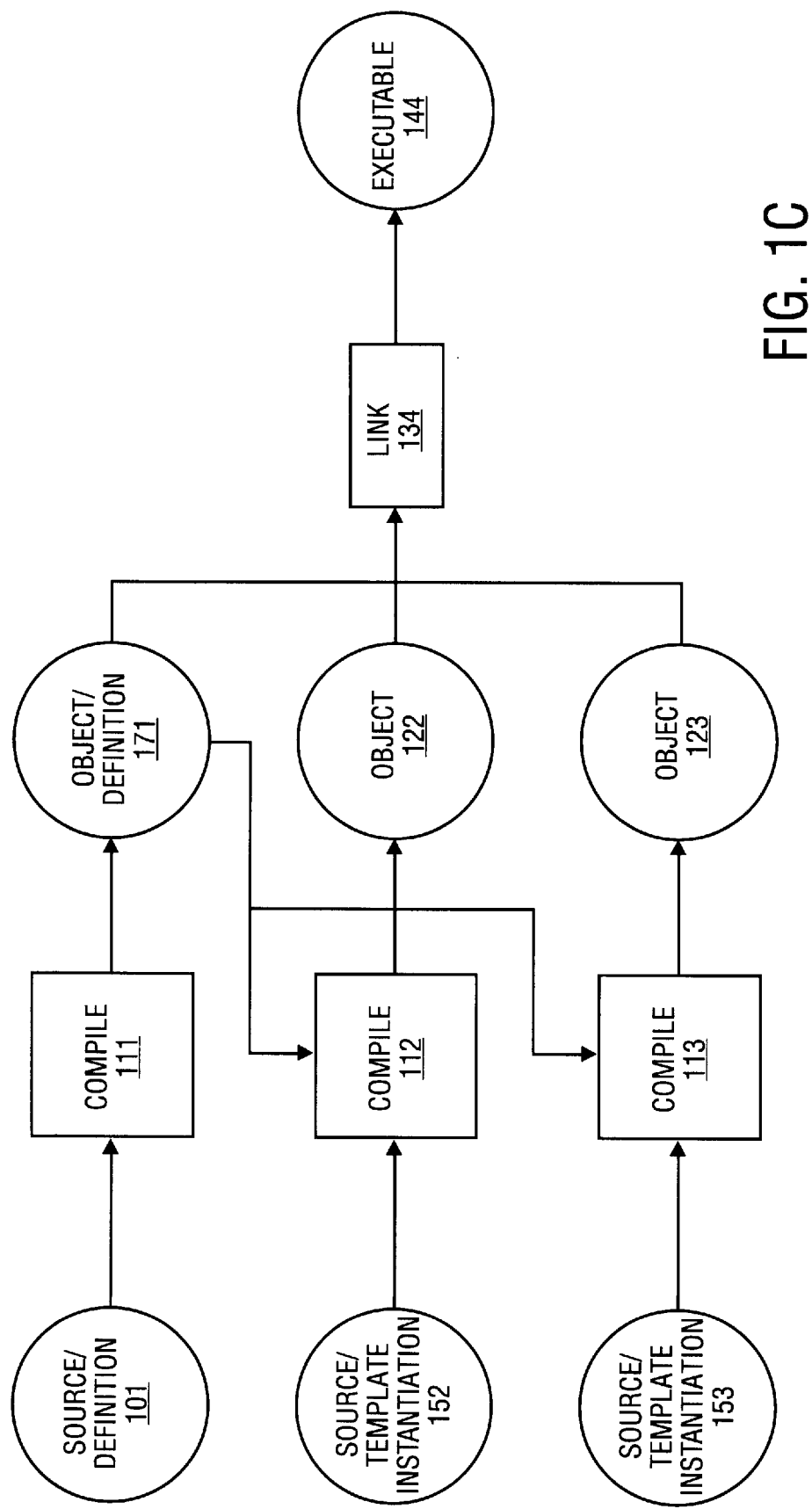
FIG. 1C illustrates a process of forming an executable file from object files as may utilize the present invention.

The present invention provides a method of incorporating automatic template instantiation into a traditional model of compilation. FIG. 1C illustrates an overall process as may be utilized by the present invention. Source files 101, 152 and 153 are provided as inputs to compilation processes 111, 112 and 113. Source file 101 comprises a template definition. Source files 152 and 153 provide template instantiations. The object file 171 thus provides a template definition which is used as input to compilation processes 112 and 113. In this way, compilation of the source files may occur with the template definition occurring in only one source file. After compilation, the object files 171, 122 and 123 are provided to linker process 134 and an executable program 144 is derived.

Though this described embodiment of the invention is described in terms of C++, it can be generally applied to any programming language which has a similar notion of templates.

Figure 1D:
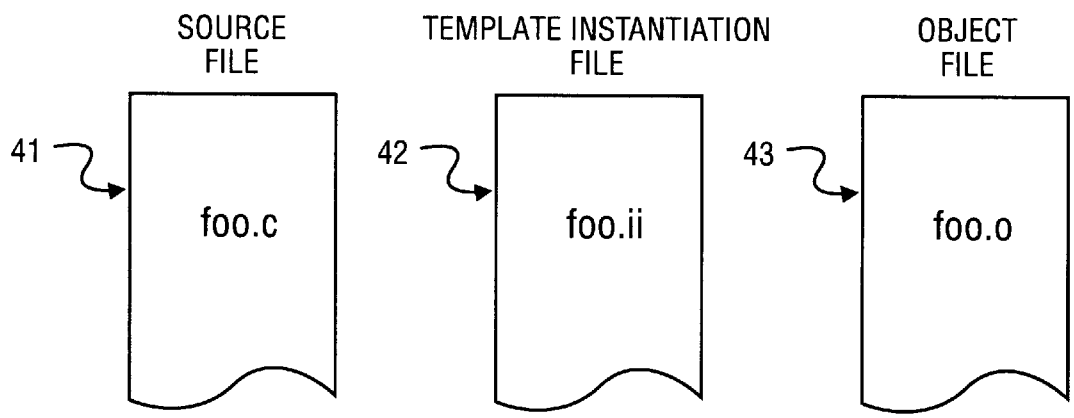
FIG. 1D illustrates files which may be utilized by an embodiment of the present invention.

As can be appreciated, the present invention creates standard object files, with some additional information to facilitate template instantiation. FIG. 1D illustrates an object file 41. A key feature of object files is that a program can be divided into several separate components and compiled separately. A change to one part of the program only requires recompiling that part and reinvoking the linker. Additionally, object files can be distributed without the source code, allowing programmers to provide parts of their code to other programs without providing their source code. This present invention maintains these essential features of object files in the presence of templates.

The described embodiment adds an additional file to each translation unit, the template instantiation file 42. In certain embodiments, the template instantiation file 42 may not be utilized but it has been found that utilization of the template instantiation file provides for more efficient compilation. The template instantiation file allows a programmer to ignore the template instantiation files 42 when dealing with this source files 41. For example, if a programmer renames, moves, or deletes a source file 41, he need not be concerned upon the effect on the template instantiation file 42.

a) The Template Instantiation File 42

In the described embodiment, a prelinker controls the selection of which translation units will produce the object code for each instantiated template in a program. Also, the prelinker determines where the definition of a template is available. This information passed to the compiler in the template instantiation file 42.

Figure 2:
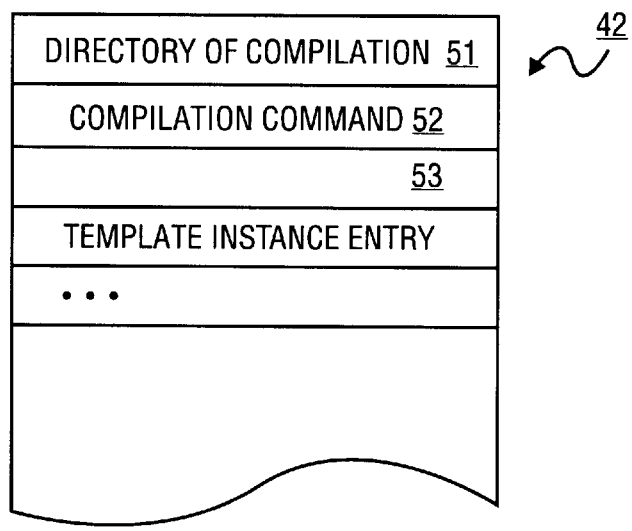
FIG. 2 illustrates the layout of a template instantiation file as may be utilized by the present invention.

FIG. 2 shows the layout of the template instantiation file 42. The first two entries, the directory of compilation 51 and the compilation command 52, allow the prelinker to reinvoke the compiler if necessary. If there are other features of the environment that affect the compilation process, their values should be stored here as well. Following these entries are the template instance entries 53. There is one entry for every template which is instantiated in this translation unit.

Figure 3:
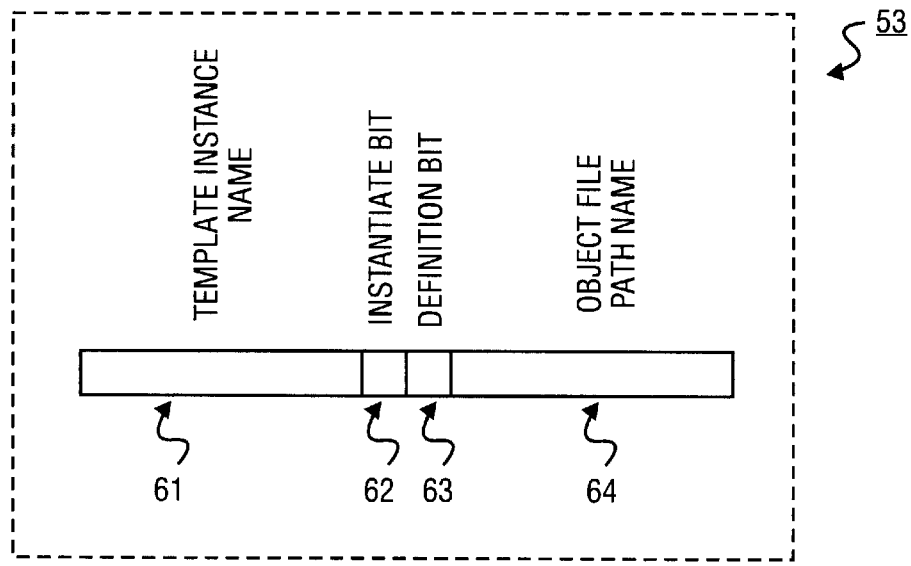
FIG. 3 illustrates template instantiation entries as may be utilized by the present invention.

FIG. 3 diagrams the template instantiation entries 53. Each entry consists of the template instance name 61, an instantiate bit 62, a definition bit 63, and an object file path name 64. The object file path name 64 is only present if both the instantiate bit 62 and the definition bit 63 are set.

b) The Object File 43

The described embodiment places the definition of all templates into the object file created from the translation unit. In one embodiment, the source code defining the template is stored. In alternative embodiments, more general representations of the template definition may be stored.

Whenever the compiler encounters a template definition, it will emit an entry into the object file containing the definition of the template. The definition of the template is retrievable from the object file. The flexibility of object files varies greatly from compilation system to compilation system, therefore, this feature is designed independently for each system.

Figure 4:
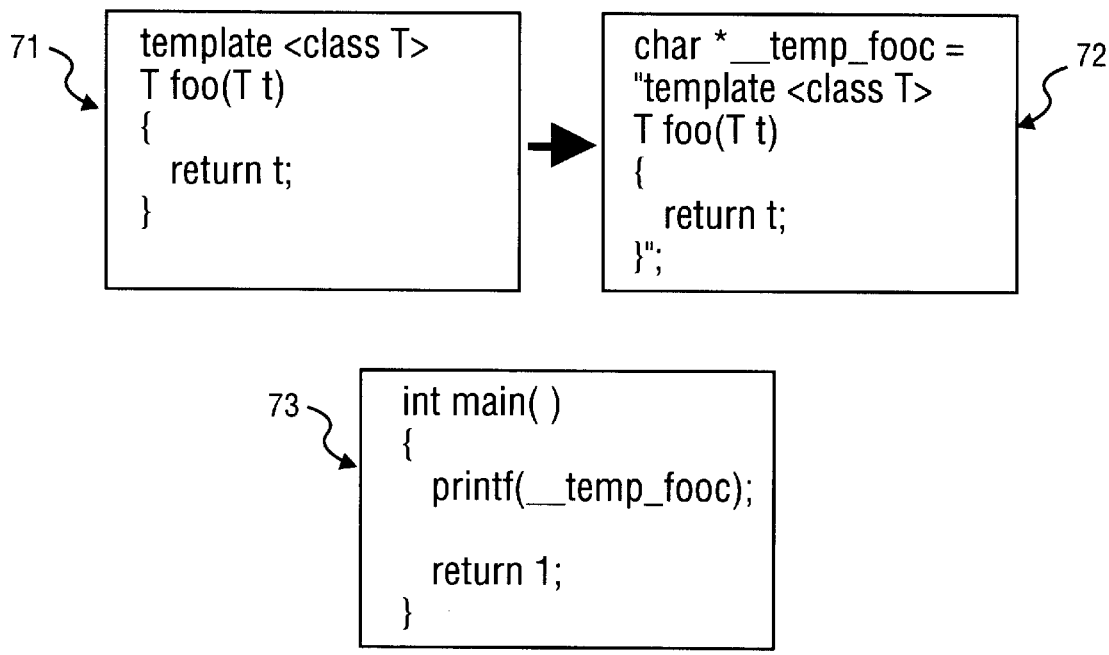
FIG. 4 illustrates a method for a compilation system as may utilize the present invention.

FIG. 4 illustrates an example of the described method. Whenever a template definition is encountered, the compiler emits a variable whose name is defined uniquely by the name of the template and the template parameters it accepts. The value of this variable is the text of the template definition. For example, a compiler which encounters the code in box 71 in a source file might emit object code into the object file equivalent to the source code in box 72. When the compiler wishes to retrieve this information from the object file, it can compile a special mainline which prints out the value of this variable and link it with the object file. Box 73 contains the mainline which will retrieve the original template definition from the object file generated from the source code in box 71.

The name of the variable can be chosen by using the name of the template followed by an encoding of the template arguments. The name should be chosen to not collide with any legally defined user variables. For example, in C and C++, all variable names prepended with two underscores are reserved for the system. Thus, the described embodiment prepends the variable name with two underscores in the example.

2. Template Instantiation

Whenever the compiler instantiates a template, it must make two important decisions. First, it must decide whether the object code for the generated function or variable should be included in the object file for this translation unit. Also, if the function/variable is to be generated from the template definition, the template definition must be obtained if it is not available in this translation unit. The described embodiment provides solutions to both of these problems.

Figure 5:
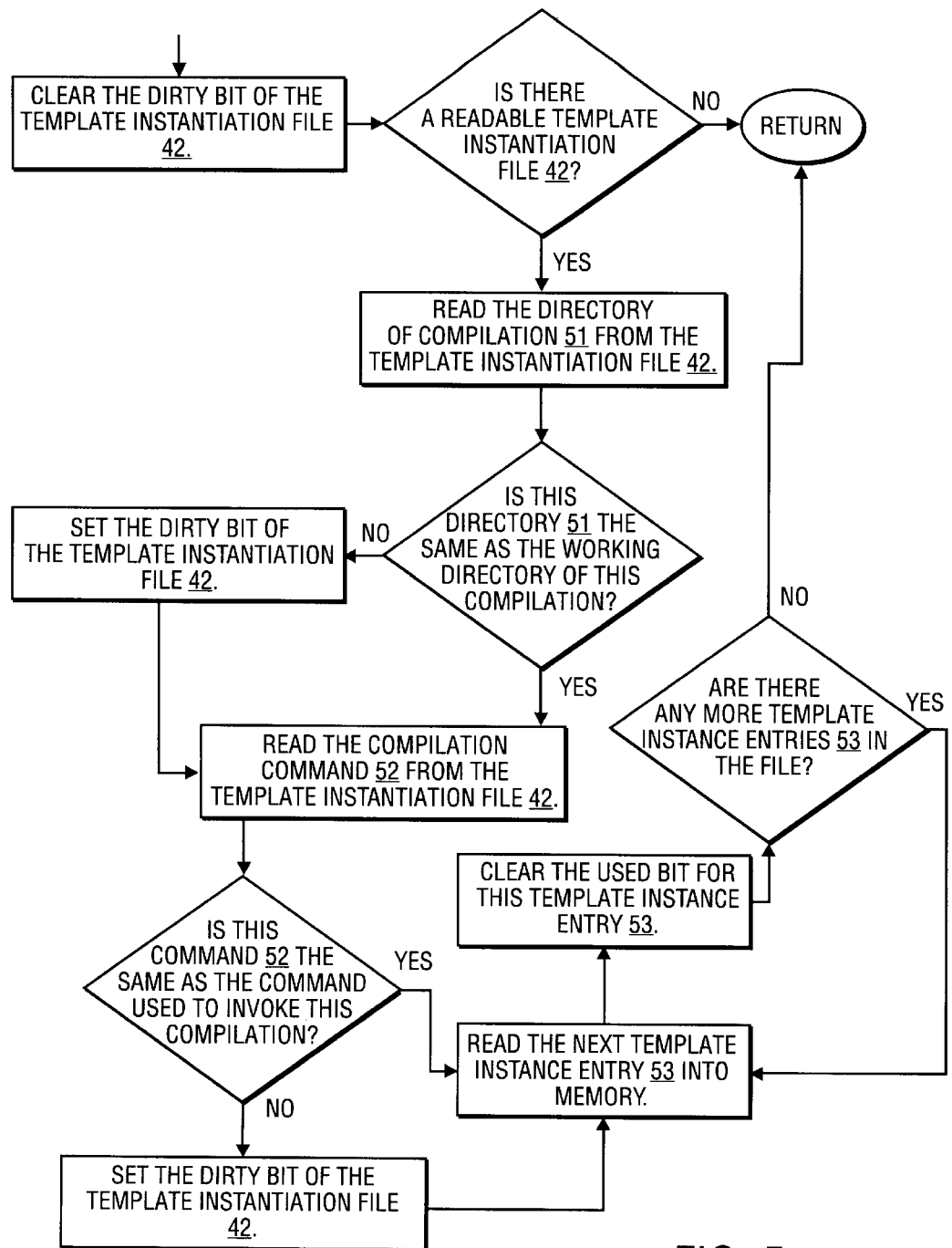
FIG. 5 illustrates an initialization procedure which may be invoked for each compilation before template instantiations are performed in accordance with the present invention.

FIG. 5 charts an initialization procedure which is invoked once for each compilation before any template instantiations are performed. In its internal data structures, the compiler includes a dirty bit for the template instantiation file 42, as well as a used bit for each of the template instance entries 53. The initialization procedure clears all of these bits, as well as reads all the template instance entries 53 from the template instantiation file 42.

Whenever an instance of a template is first referenced, it must be instantiated. The exact criteria for instantiation has been spelled out by the ANSI/ISO C++ standard definition. When a template is instantiated, the compiler must decide if it is to emit the object code for the template instance into the object file. The object code for the function/variable needs only be included into one object file for a program, so always emitting the object code is wasteful in both compilation time and the size of the object files. If the object code of the template instance is to be emitted, the definition of the template is necessary. If the definition exists in this translation unit, that definition is used. Otherwise, the definition must be obtained in some other way. The described embodiment retrieves the definition from an object file 43 from another translation unit. The object file 43 containing a definition of the template is stored in the template instance entry 53, which is set by the prelinker.

Figure 6A:
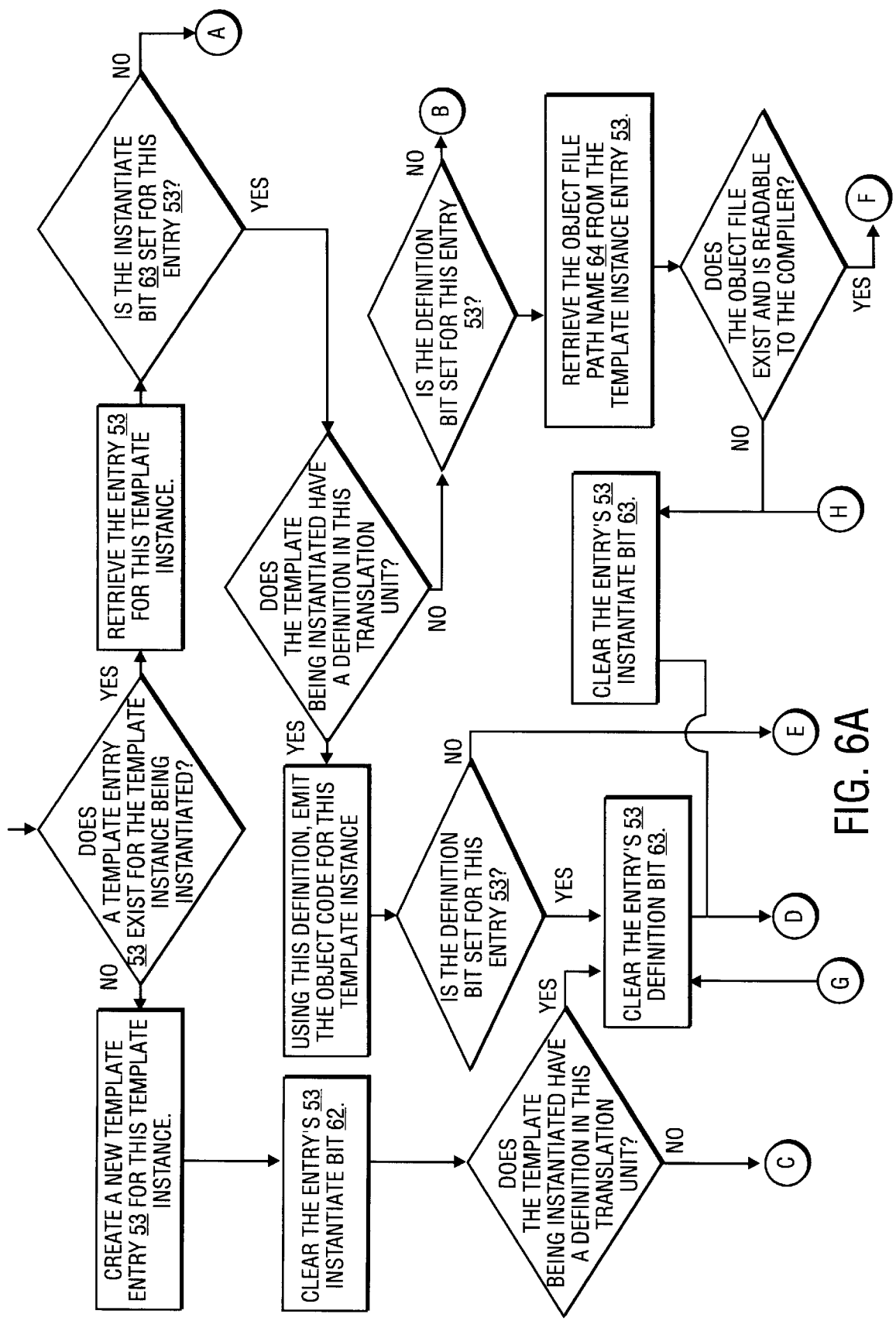
FIGS. 6A and 6B illustrate a flow chart of a template instantiation procedure as may implement the present invention.
Figure 6B:
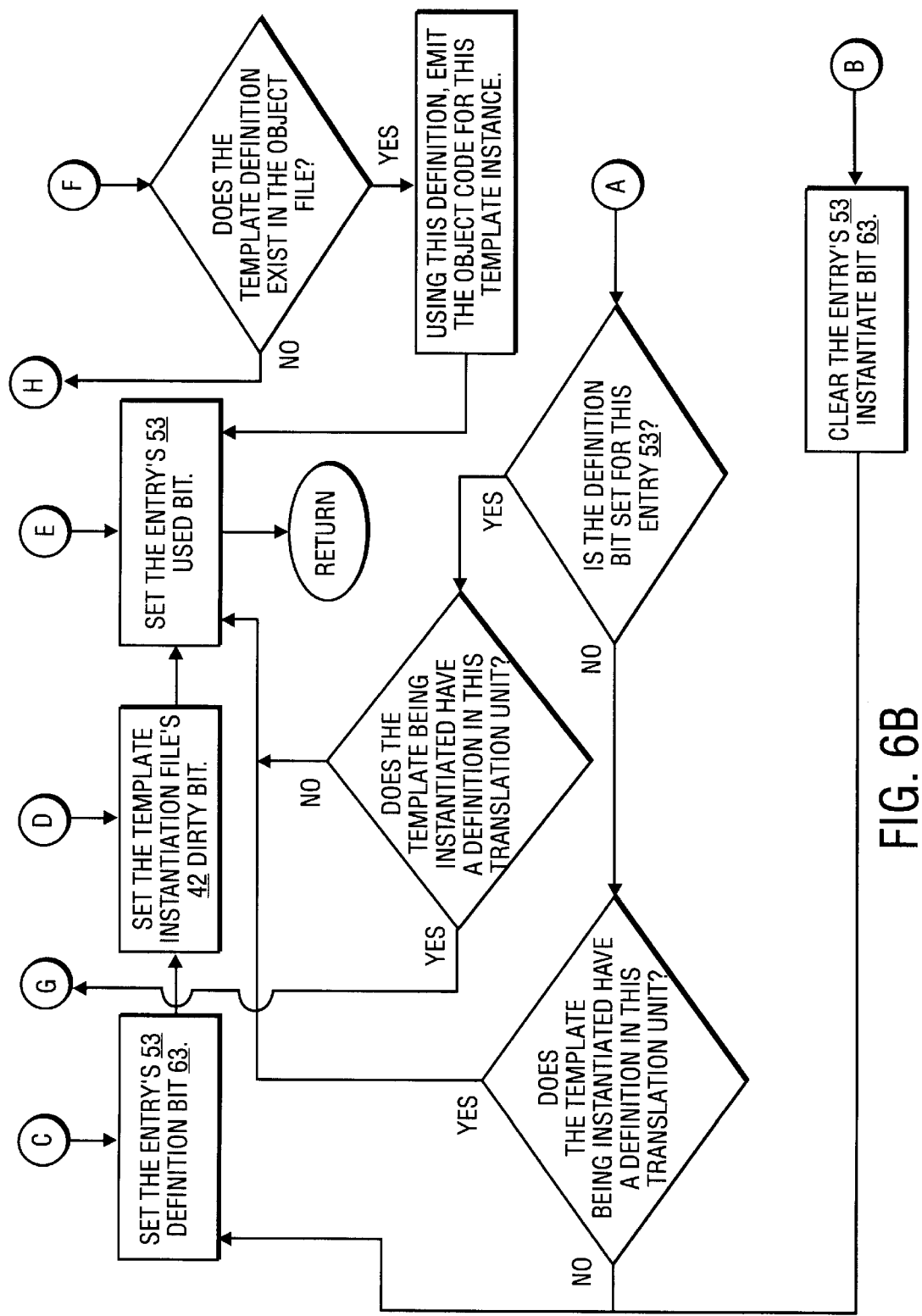

FIGS. 6A and 6B are a flow chart of the template instantiation procedure.

Figure 7:
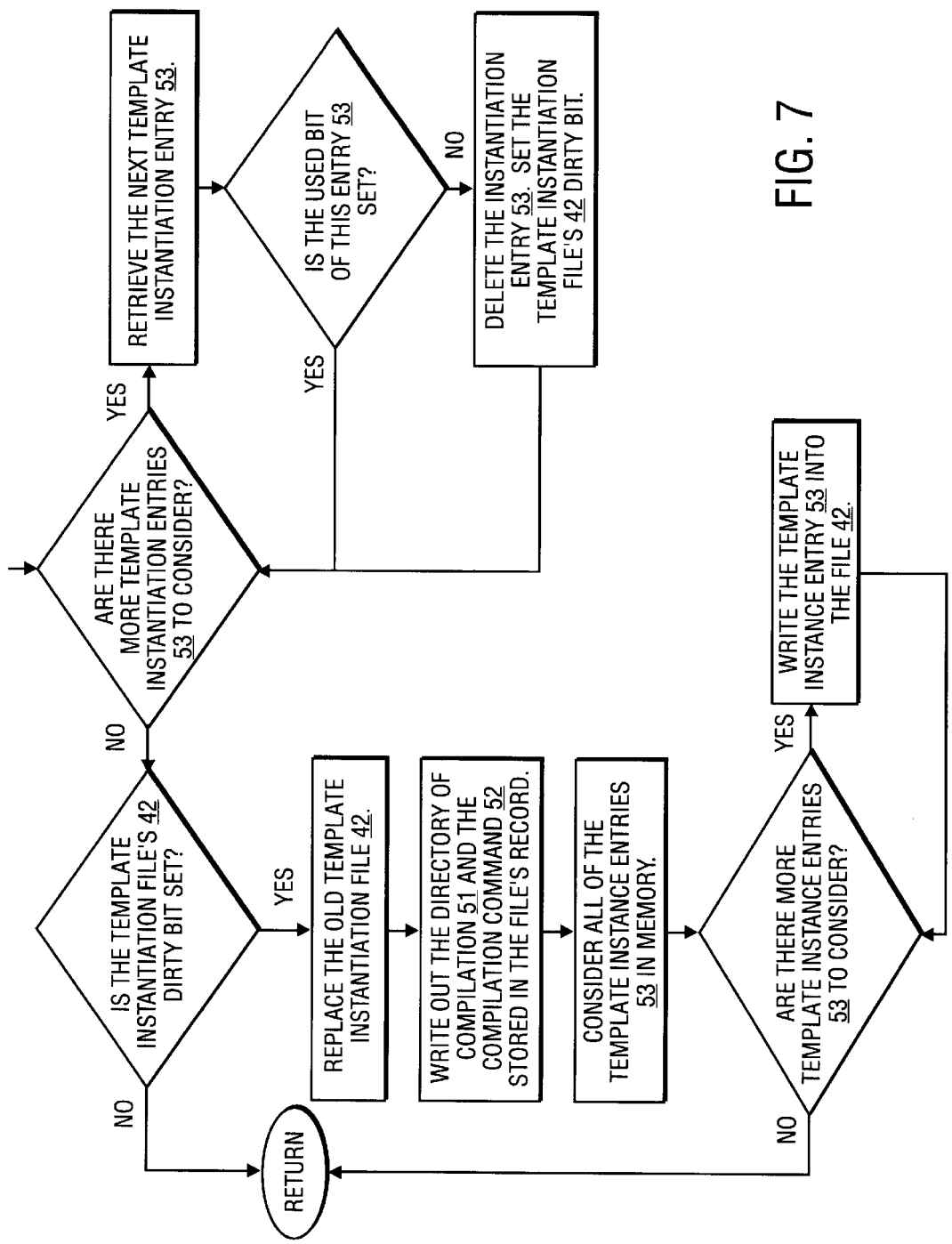
FIG. 7 illustrates a cleanup procedure which is performed after template instantiations as may be implemented in the present invention.

Finally, FIG. 7 describes a cleanup procedure which is performed once after all template instantiations. The purpose of the cleanup procedure is to ensure that the template instantiation file 42 contains an template instance entry 53 for exactly the set of template instances instantiated in this translation unit. Note that a template instance entry 53 might be deleted because the programmer has modified the source file 41 such that a template instance is no longer referenced, but was on a previous compilation.

3. The Prelinker

The prelinker is used in place of the normal system linker. It is invoked on the set of object files 43 which are supposed to form a program. The prelinker successively calls the linker, terminating if the link is successful. Otherwise, the prelinker attempts to fix any errors reported by the linker. It tries to fix the errors by changing which template instance object code is emitting by which translation units.

Figure 8A:
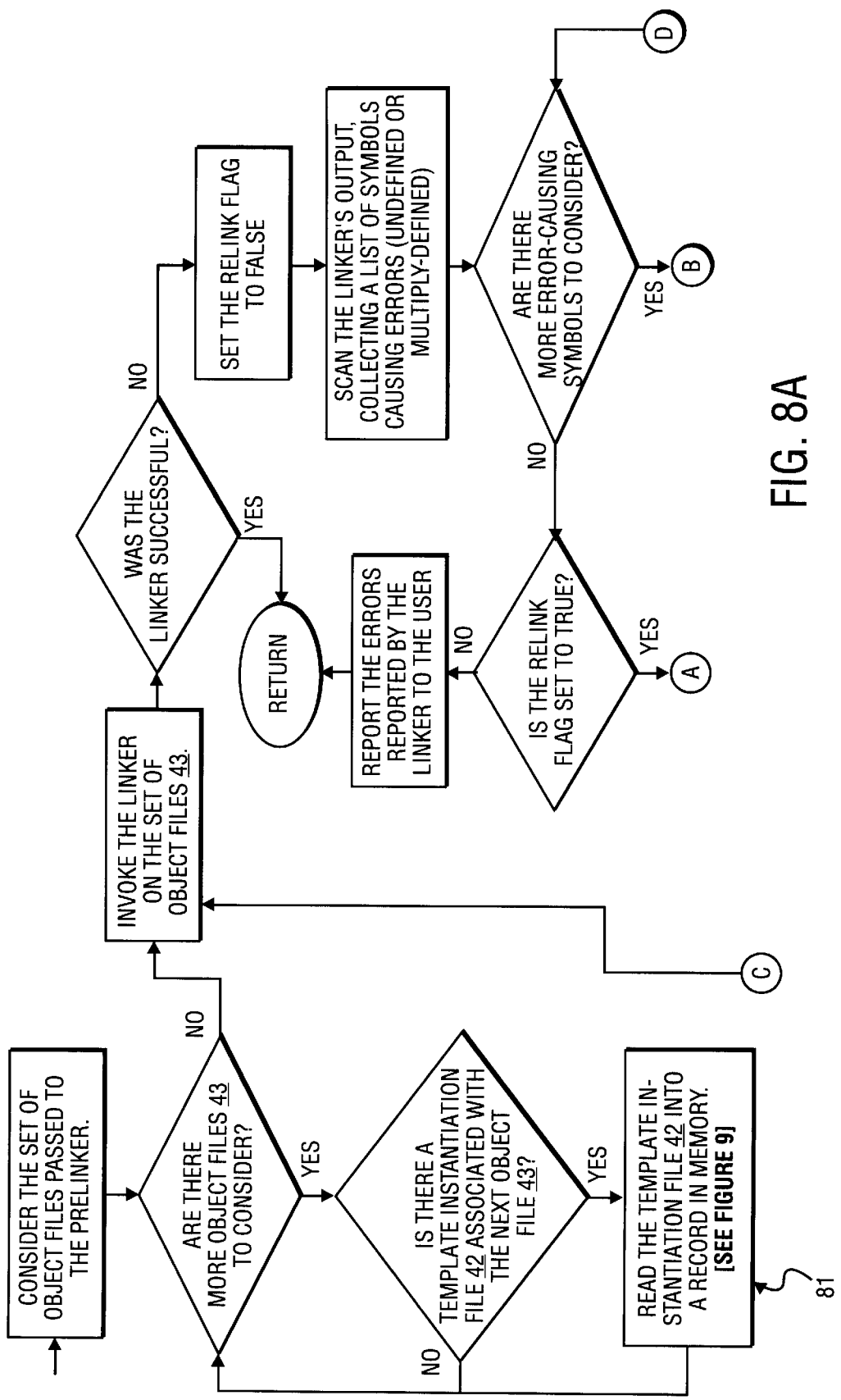
FIGS. 8A and 8B illustrate a flow diagram of the main algorithm of the prelinker as may be utilized in the present invention.
Figure 8B:
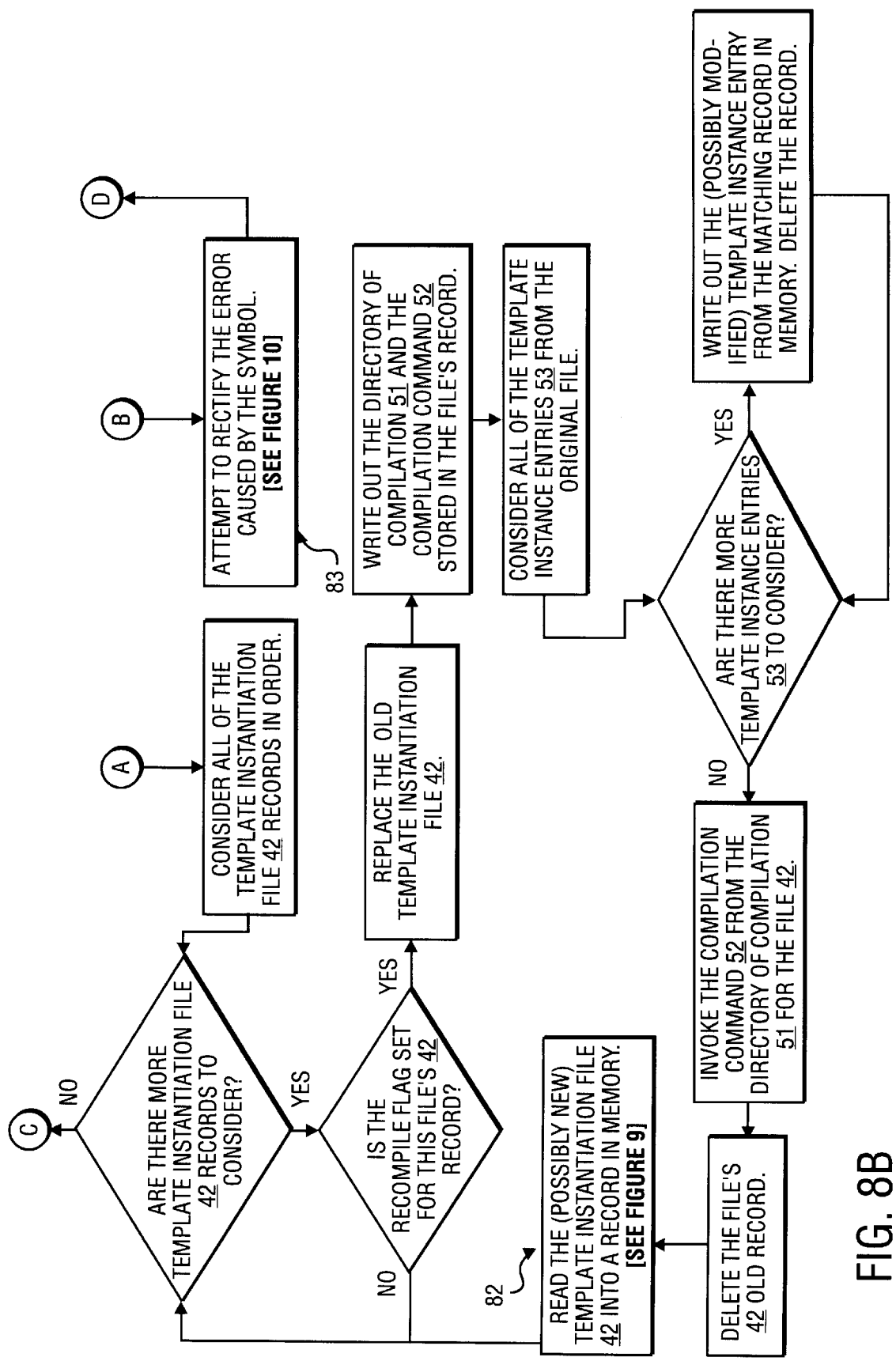
Figure 9:
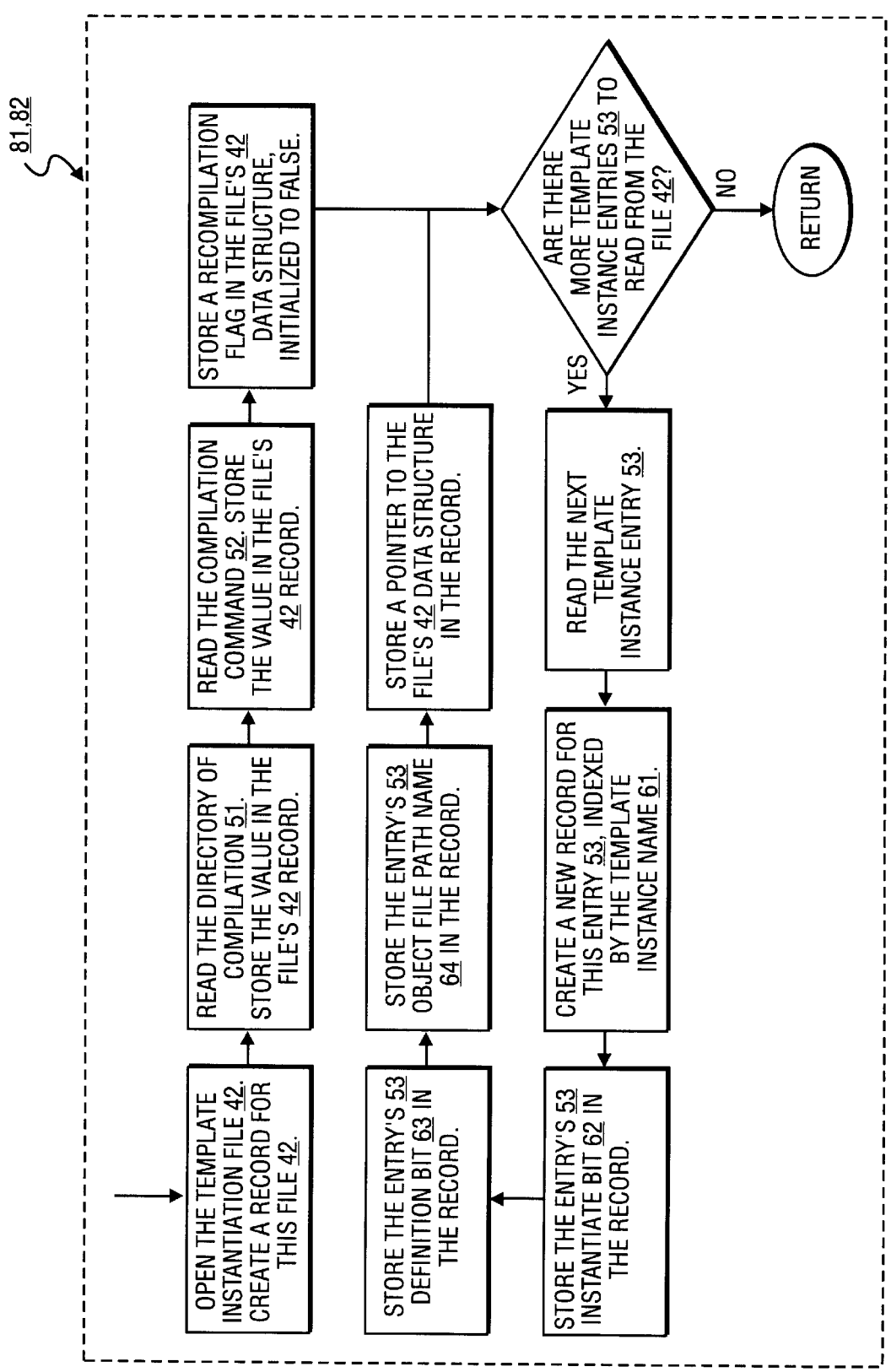
FIG. 9 illustrates a method of reading template instantiation file.

FIGS. 8A and 8B are a flow diagram of the main algorithm of the prelinker. In order to decide how to resolve the linker errors, the prelinker reads in all the template instantiation files 42 that are associated with the object files 43 it is linking. The process of reading in one template instantiation file 42 is diagrammed in FIG. 9. Each template instantiation file has a record associated with it. This record stores the directory of compilation 51, the compilation command 52, and a recompilation flag. Each template instance entry 53 in the repository files also have a record associated with it. These records are stored in a hash table indexed by their template instance names 61. The record of each template instance entry 53 stores the instantiate bit 62, the definition bit 63, and the object file path name 64, of the entry 53. Note that in the described embodiment, every template instance entry 53 has exactly one record, and the records are not shared. Thus, the hash table must be able to store a set of records under any given template instance name 61.

Figure 10A:
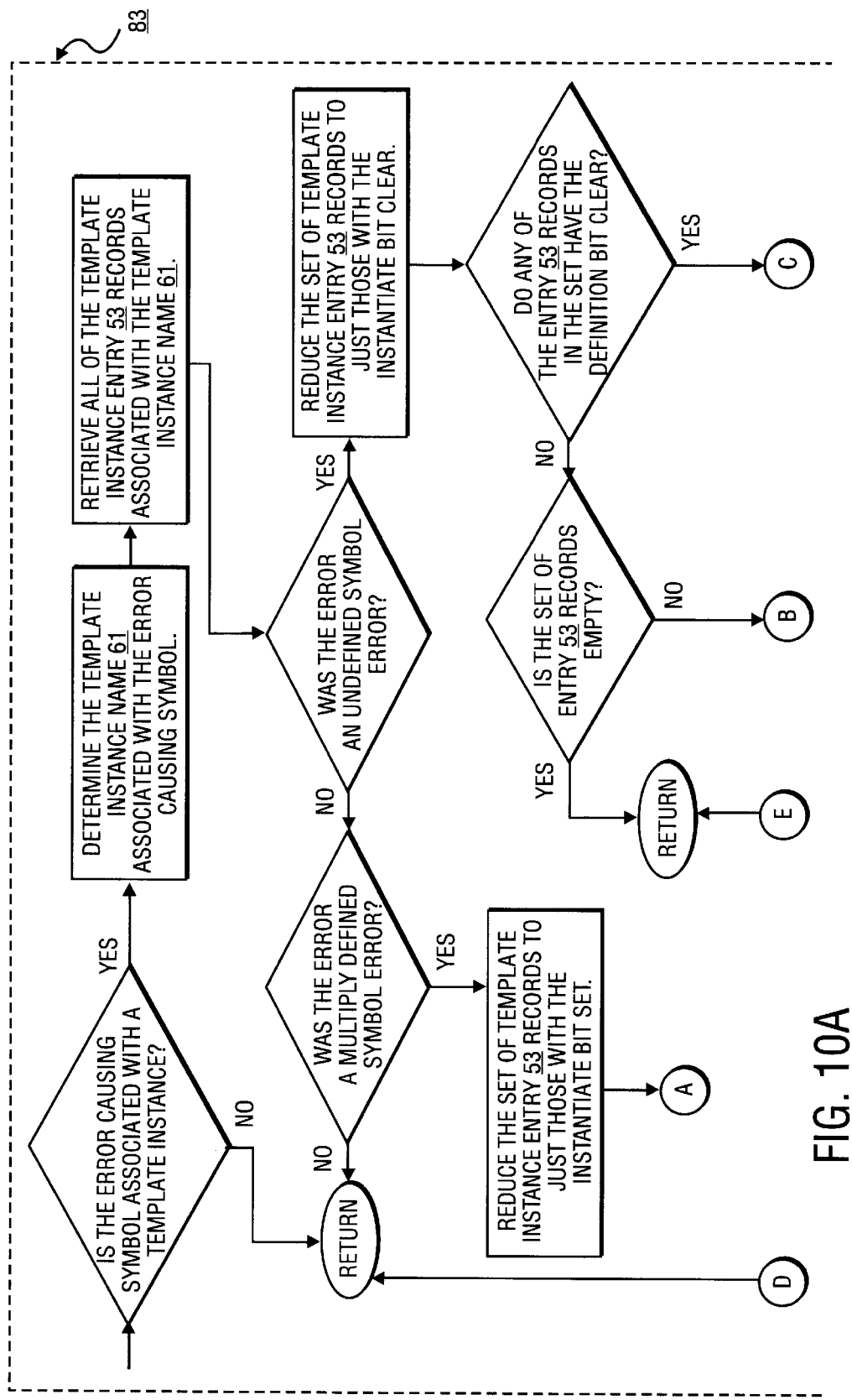
FIGS. 10A and 10B illustrate a flow diagram of a procedure to resolve link errors as may be implemented in the present invention.
Figure 10B:
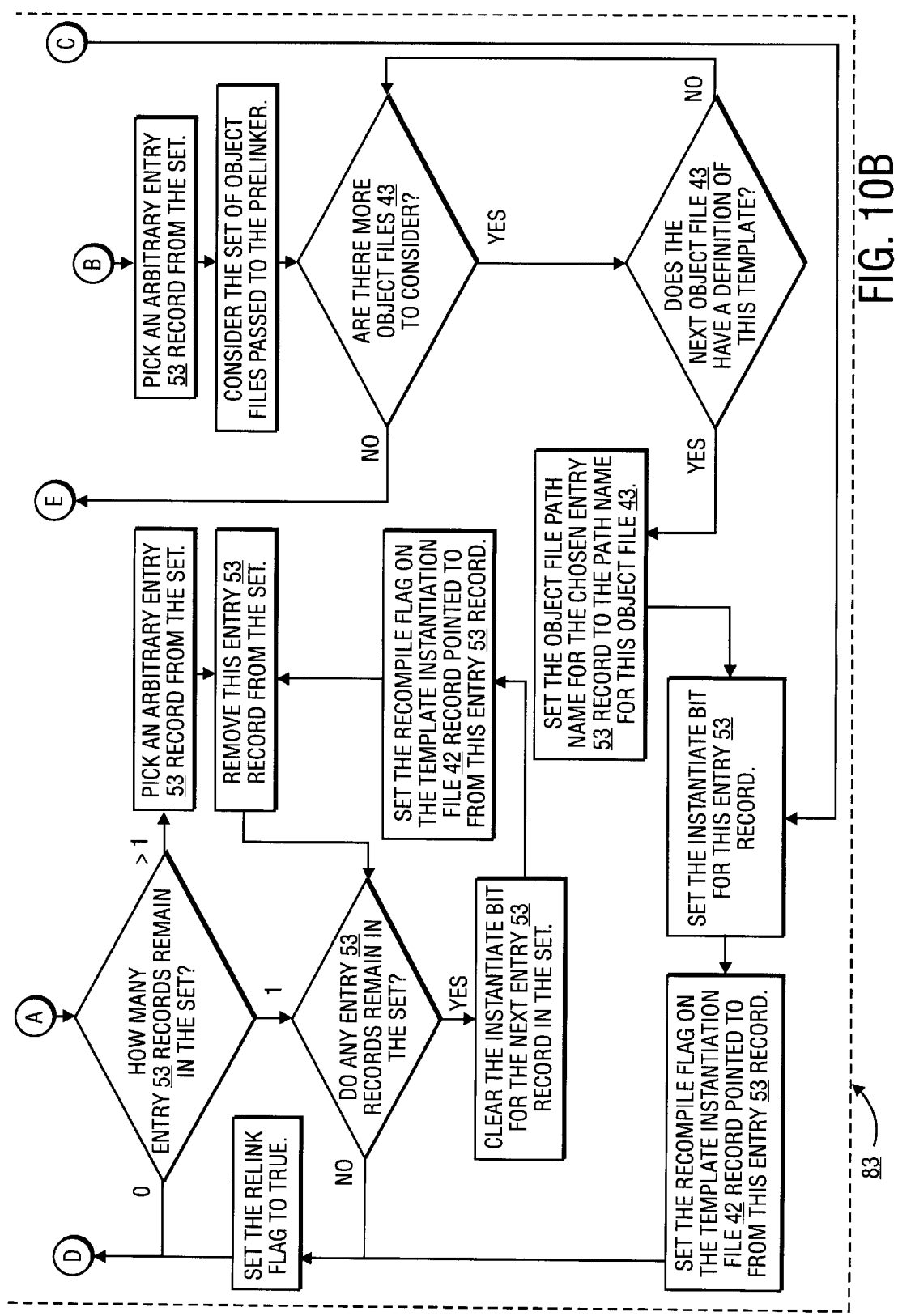

FIGS. 10A and 10B are a flow diagram of the procedure to resolve link errors. Link errors are normally limited to undefined symbols errors and, on some systems, multiply defined symbols. If the symbol causing an error is a symbol referring to a template instance name 61, then the prelinker might be able to resolve the error by changing the instantiate bit 62 for some template instance entries 53. For an undefined symbol, changing the appropriate instantiate bit 62 to true will cause the compiler to emit a definition for the symbol in that translation unit. Conversely, if a symbol is defined more than once, the prelinker can change an instantiate bit 62 to false which will remove the symbol definition from that translation unit. After any instantiate bits 62 are modified, the compiler is reinvoked for that translation unit in order to incorporate the change in the object file 43. The details of this procedure are in FIGS. 10A and 10B.

4. Template Definition Representation

In the just described embodiment, the source code of a template definition was stored in the object file 43. This has a few disadvantages. First, every time the template is instantiated, the source code must be reparsed, which often is the most time consuming part of compilation. Additionally, if the programmer wishes to distribute any object files 43, the programmer is effectively distributing source code. A solution to both of these problems is to store the intermediate code generated from the source code, which is typically the data structure passed between the front end and back end of a compiler. For some compilers, this might involve extending the intermediate code syntax to incorporate handling variables of (as yet) unspecified type or size. When the template is instantiated, the type and size of these variable will be known, and the intermediate code can easily be converted to standard intermediate code. This can be taken a step further, and actually produce machine code for the parts of the template definition which do not depend upon the template parameters. Though such a representation could still be reverse engineered to produce source code, the protection involved will be comparable to standard object code generated from standard source code.

There is one additional problem to distributed object files 43 containing template definition. The embodiments described thus far allow for the distribution of object files 43 from source files 41 which define templates. However, object files which use templates can not be distributed. In an alternative embodiment, the prelinker can be slightly modified to that it can be presented with a set of object files 43 that will create another object file 43 (or maybe a library of object files), which resolves all of the undefined template symbols in the set of object files. The process used will be exactly identical to the prelinker as described in FIGS. 8A and 8B, with one small modification. Because it is not a complete program being presented to the linker, there will always be undefined symbols which the prelinker will not be able to resolve. Instead of reporting these errors to the user, the prelinker will terminate.

ALTERNATIVES TO THE PREFERRED EMBODIMENT OF THE PRESENT INVENTION

There are, of course, alternatives to the described embodiment which are within the reach of one of ordinary skill in the relevant art.

What is claimed is:

1. A method of creating an executable program from source programs having templates comprising the steps of:
    a) providing a first source file having a template definition;
    b) providing a second source file having a template instantiation;
    c) compiling the first source file and the second source file into first and second object files, the first object file comprising a template definition;
    d) linking the first and second object files into an executable program.

2. The method as recited by claim 1 wherein the first source file is a C++ file.

3. A method of creating an executable program from source programs having templates comprising the steps of:
    a) providing a first source file having a template definition;
    b) compiling the first source file into a first object file;
    c) providing a second source file having a template instantiation;
    d) compiling the second source file into a second object file, the step of compiling the second source file into a second object file having as inputs the second source file and a translation of the template definition.

4. The method as recited by claim 3 wherein the first source file is a C++ file.

5. A method of creating an executable program from source programs having templates comprising the steps of:
    a) providing a first source file having a template definition;
    b) compiling the first source file into a first object file;
    c) providing a second source file having a template instantiation;
    d) compiling the second source file into a second object file, the step of compiling the second source file into a second object file having as inputs the second source file and the template definition from the first object file.

6. The method as recited by claim 5 wherein the first source file is a C++ file.

* * * * *